(12) United States Patent
Topham

(10) Patent No.: US 9,547,493 B2
(45) Date of Patent: Jan. 17, 2017

(54) SELF-TIMED USER-EXTENSION INSTRUCTIONS FOR A PROCESSING DEVICE

(71) Applicant: Synopsys, Inc., Mountain View, CA (US)

(72) Inventor: Nigel Topham, Edinburgh (GB)

(73) Assignee: Synopsys, Inc., Mountain View, CA (US)

(*) Notice: Subject to any disclaimer, the term of this patent is extended or adjusted under 35 U.S.C. 154(b) by 210 days.

(21) Appl. No.: 14/506,577

(22) Filed: Oct. 3, 2014

(65) Prior Publication Data

US 2015/0100767 A1 Apr. 9, 2015

Related U.S. Application Data

(60) Provisional application No. 61/886,563, filed on Oct. 3, 2013.

(51) Int. Cl.
*G06F 15/76* (2006.01)
*G06F 13/28* (2006.01)
*G06F 9/30* (2006.01)
*G06F 3/0484* (2013.01)

(52) U.S. Cl.
CPC ....... *G06F 9/30192* (2013.01); *G06F 3/04842* (2013.01)

(58) Field of Classification Search
CPC .......................... G06F 9/3867; H04N 19/436
See application file for complete search history.

(56) References Cited

U.S. PATENT DOCUMENTS

| | | | | |
|---|---|---|---|---|
| 9,064,076 | B1* | 6/2015 | Braun | G06F 17/505 |
| 2002/0008761 | A1* | 1/2002 | Caci | G06T 1/60 |
| | | | | 348/222.1 |
| 2004/0098563 | A1* | 5/2004 | Parthasarathy | G06F 9/30043 |
| | | | | 712/34 |
| 2004/0133432 | A1* | 7/2004 | Sugumar | G06F 9/3013 |
| | | | | 712/218 |
| 2005/0166038 | A1* | 7/2005 | Wang | G06F 9/30145 |
| | | | | 712/226 |
| 2007/0073925 | A1* | 3/2007 | Lim | G06F 9/30003 |
| | | | | 710/22 |
| 2007/0074012 | A1* | 3/2007 | Graham | G06F 9/30003 |
| | | | | 712/227 |

* cited by examiner

*Primary Examiner* — Hyun Nam
(74) *Attorney, Agent, or Firm* — Fenwick & West LLP

(57) ABSTRACT

A processor for executing configurable instructions and a method of configuring the processor are disclosed. In one embodiment, the processor includes (i) a processor core to execute preconfigured instructions and (ii) a processor core extension to execute user-defined extension instructions that are configurable instructions. The user-defined extension instructions may include an autonomous instruction with varying execution cycles based on source data and an operation performed. The processor core extension employs extension interface signals as a handshake protocol to operate together with the processor core without knowing any priori knowledge of how many processor clock cycles that the autonomous instruction will take to complete.

21 Claims, 5 Drawing Sheets

SELF-TIMED USER-EXTENSION INSTRUCTIONS FOR A PROCESSING DEVICE

CROSS REFERENCE TO RELATED APPLICATION

This application claims the benefit of U.S. Provisional Application No. 61/886,563, filed Oct. 3, 2013, which is incorporated by reference herein in its entirety.

BACKGROUND

1. Field of Art

This disclosure relates generally to configuring a processing device to include user-defined instructions.

2. Description of the Related Art

Generally, for a particular instruction, a processor takes a certain number of clock cycles to complete its operation and produce a result. Processors that implement a pipeline architecture use instruction pipelines to allow overlapping execution of multiple instructions. Processing overlapping instructions allows the processor pipeline to continue execution while other pipelined instructions are being executed by various pipeline stages.

For processors that use a pipeline architecture, pipelined instructions experience some amount of latency. Latency may be represented by the number of processor clock cycles that occur from the time the instruction enters the instruction pipeline until the instruction generates a result. For some deterministic operations, the processing latency can be determined prior to execution of the instruction. Using the predetermined processing latency, the designer can construct an instruction pipeline to accommodate the processing latency of a particular instruction. Other types of instructions, however, do not take a data dependent amount of time to execute (i.e., no predetermined processing latency). These types of instructions, however, are typically not implemented as a pipelined instruction because it is unknown when the instruction will produce a result. These limitations, in turn, reduce the processing efficiency for certain operations.

SUMMARY

A configurable processor is a programmable computing unit that may be customized to meet different performance, power, and area specifications for different applications. To customize the processor, a user may specify one or more user-defined extension instructions (herein also referred to as extension instructions). In one aspect, a user specifies an extension instruction without a latency requirement, called an autonomous (or self-timed) instruction. In one implementation, the processor includes (i) a processor core to execute preconfigured instructions that are not reconfigurable and (ii) a processor core extension to execute the user-defined extension instructions that are reconfigurable. The processor core extension may operate together with a processor core to execute user-defined extension instructions.

In one embodiment, the processor core extension includes extension interface logic and extension logic. The extension logic executes the user-defined extension instruction. The extension interface logic is coupled to the processor core and the extension logic. The extension interface logic coordinates operations of the extension logic and the processor core by employing extension interface signals as a handshake protocol. In one example, the handshake protocol uses an output extension interface signal called a ready status signal to provide an indication of when the user-defined extension instruction is ready to provide a result. This, in turn, allows a user-defined extension instruction to be added to the processor without any priori knowledge of how many processor clock cycles that the user-defined extension instruction will take to complete.

In one embodiment, a method of configuring a processor core extension for executing a user-defined extension instruction is disclosed. In one approach, extension configuration information defining the processor core extension is received. The extension configuration information may describe a user-defined extension instruction (e.g., an autonomous extension instruction) and information about at least one of registers and condition codes of the processor core extension.

In addition, candidate interface signals for communicating via an extension interface between a processor core and extension logic in the processor core extension is identified. Preferably, the identified candidate interface signals include a ready status signal.

In one aspect, a list of identified candidate interface signals and information about one or more of the identified candidate interface signals are generated for display on a user interface. A user may select a set of interface signals to be processed by the extension interface from the list of identified candidate interface signals. Moreover, the selection of the set of interface signals is received.

Furthermore, a digital representation of the extension logic to process a user-defined extension instruction (e.g., autonomous instruction) is generated. In addition, a digital representation of extension interface logic to process the selected set of interface signals is generated. The digital representations of the extension logic and the extension interface logic may be used to implement or configure a processor in a hardware unit that can execute user-defined extension instructions including an autonomous instruction.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Processor Overview

Figure 1:
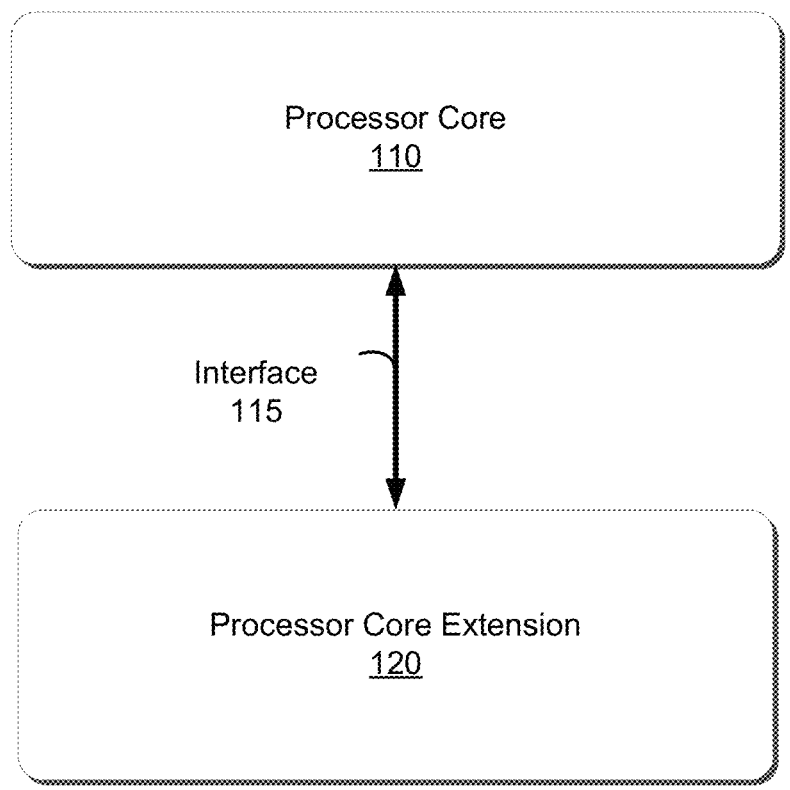
FIG. 1 is a high level block diagram illustrating a configurable processor, in accordance with an embodiment.

FIG. 1 is a block diagram of a processor 100. In one embodiment, the processor 100 includes a processor core 110 and a processor core extension 120. The processor core 110 executes preconfigured instructions that are not reconfigurable and the processor core extension 120 executes user-defined extension instructions (herein also referred to as "extension instructions"). In one aspect, the extension instructions are implemented without specifying a latency requirement (i.e., self-timed or autonomous). The processor 100 and the processor core extension 120 may operate together by communicating through an interface 115. Each of these components may be embodied as hardware, firmware, or a combination thereof, and may operate together to execute extension instructions. Preferably, the processor core 110 and the processor core extension 120 are implemented on a same hardware (e.g., embedded processor). Alternatively, the processor core 110 and the processor core extension 120 may be implemented on separate hardware or multiple distinct components.

In one aspect, the processor core 110 executes preconfigured instructions that are not reconfigurable. The processor core 110 may include a pipeline (not shown) that includes multiple pipeline stages connected in series. The pipeline (not shown) executes instructions at a rate of one instruction per processor clock cycle. Multiple instructions, up to the number of pipeline stages, can propagate through the pipeline (not shown) in a serial fashion with one instruction being processed by a pipeline stage.

In one example, the processor core 110 includes a pipeline (not shown) having three stages including instruction fetch, execute, and commit stages, wherein each stage processes one instruction at a time. The fetch stage accesses instruction memories, including instruction cache, instruction fetch queue; extracts and aligns instructions that might span individual fetches; and decodes source register addresses. The execute stage reads source registers from the general-purpose register file; decodes each instruction's operator and operand formats received from the fetch stage; performs single-cycle arithmetic logic unit (ALU) operations, such as arithmetic, logical, shift, etc., specified by the instruction data received from the fetch stage; computes memory addresses for load and store instructions; selects the next data-memory operation to be performed; and performs branch and jump instructions. The commit stage prioritizes and performs interrupts and exceptions; detects and handles any mis-speculation in the program sequence; accesses data memories, including data cache and external memory; and commits processor state by writing destination registers and updating auxiliary registers according to the semantic definition of the committed instruction. In other implementations, the pipeline includes alternative, fewer, or additional stages.

In one aspect, the processor core 110 may operate in a non-blocking mode or blocking mode. In the non-blocking mode, other instructions following a non-blocking instruction may be processed in the pipeline, while the non-blocking instruction is being executed. In the blocking mode, any instruction after a blocking instruction in the pipeline is stalled at the register-fetch stage until the blocking instruction completes. The instructions following the blocking instruction may proceed to the execute stage in the pipeline after the blocking instruction completes.

The processor core extension 120 is a processing unit that enables customized extension instructions to be executed. The processor core extension 120 enables the processor 100 to be extensible in that additional condition codes, core registers, auxiliary registers, and instructions not supported in the processor core 110 may be specified to add functionality to the processor core extension 120. Condition codes herein refer to codes for testing processor flags on instructions. The processor core extension 120 receives an extension instruction to be executed and source data from the processor core 110 through the interface 115, and executes the extension instruction that may not be executed by the processor core 110. Preferably, the processor core extension 120 coordinates its operation with the processor core 110 through the interface 115.

In one aspect, the processor core extension 120 executes extension instructions in the non-blocking mode or blocking mode with the processor core 110. Certain non-blocking mode extension instructions executed by the processor core extension 120 may have a specified latency to complete the execution. Other non-blocking extension instructions may not have any specified or predetermined latency. The non-blocking extension instructions having undefined number of execution cycles (herein also referred to as "self-timed instructions" or "autonomous instructions") have varying execution cycles depending on input data, a type of operation performed, processor architecture, and other factors affecting the execution of the self-timed instruction. To coordinate operations with the processor core 110, the processor core extension 120 provides a notification to the processor core 110 regarding the status of the extension instruction being executed through the interface 115. Responsive to the received notification, the processor core 110 may allow the self-timed instruction to proceed to the commit stage in the pipeline. This, in turn, allows self-timed instructions to be included in the processor 100 without any priori knowledge of how many processor clock cycles that the instruction will take to complete.

Figure 2:
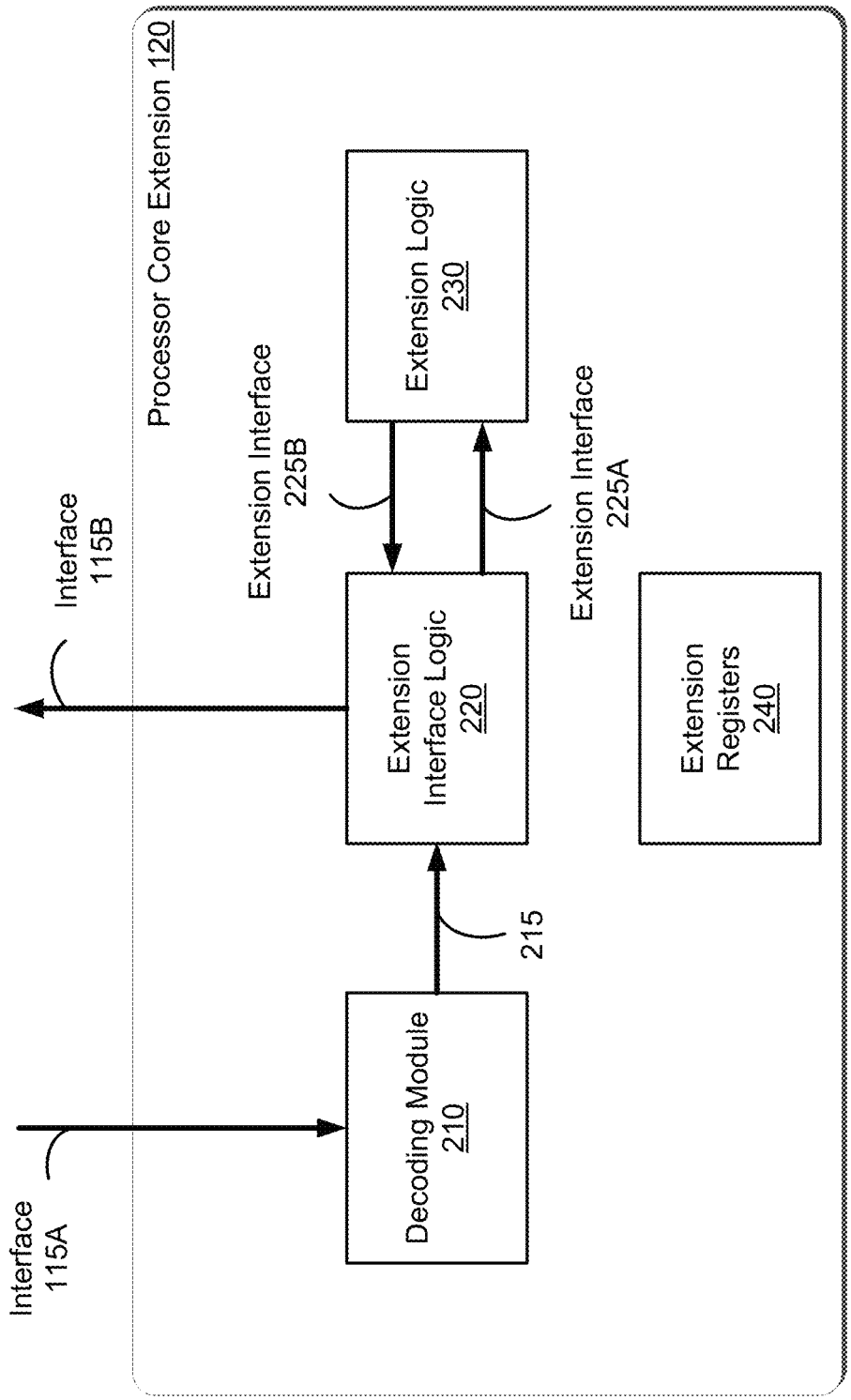
FIG. 2 is a detailed diagram of a processor core extension in the processor of FIG. 1, according to one embodiment.

Referring to FIG. 2, illustrated is one embodiment of the processor core extension 120. In one implementation, the processor core extension 120 includes a decoding module 210, extension interface logic 220, extension logic 230, and extension registers 240. Together, these components execute extension instructions and may operate together with the processor core 110 through an interface 115A and interface 115B. The processor core extension 120 receives an extension instruction from the processor core 110 through the interface 115A, and transmits execution result of the extension instruction to the processor core 110 through the interface 115B. In one implementation, the interface 115A and 115B each may support up to 64-bit instructions according to size of extension instruction, which may be specified by a user.

In one implementation, the decoding module 210 receives an extension instruction and decodes the extension instruction received from the processor core 110 through the interface 115A. In another implementation, the decoding module 210 receives a signal or a command to control operation of the processor core extension 120 through the interface 115. For example, the processor core extension 120 may receive a signal or a command to stall or terminate execution of an extension instruction. Preferably, the decoding module 210 receives the extension instruction prior to a decoding in the execute stage of the pipeline in the processor core 110 through the interface 115A. The decoding module 210 may decode source register address, each extension instruction's operator and operand formats received from the processor core 110. The decoding module 210 provides operands 215 corresponding to the extension instruction to the extension interface logic 220.

The extension logic 230 executes customized extension instructions, according to extension interface signal 225A associated with the operands 215 from the extension interface logic 220. In one implementation, the extension logic 230 performs custom designed single-cycle arithmetic logic unit (ALU) operations, such as arithmetic, logical, shift that may not be implemented in the processor core 110. The extension logic 230 may support different types of instructions, including a single or multi-cycle instruction with arbitrary logic, and dual, single, or zero-operand instruction extensions with arbitrary logic. The extension logic 230 may execute multi-cycle instructions in a non-blocking or blocking mode. In one approach, the extension logic 230 uses a handshake protocol to communicate with the extension interface logic 220. The extension logic 230 may provide the status of the execution of the extension instruction and execution results to the extension interface logic 220 through extension interface signal 225B. Hence, the extension logic 230 may execute self-timed instructions having undetermined latency.

The extension interface logic 220 mediates operations of the processor core 110 and the extension logic 230 using the handshake protocol. Preferably, the extension interface logic 220 employs one or more extension interface signals 225 for communicating with the extension logic 230 and coordinates operations of the extension logic 230 with the processor core 110. In one embodiment, the extension interface logic 220 receives operands 215 from the extension interface logic 220, and provides one or more input extension interface signals 225A associated with the operands 215 to the extension logic 230. In one embodiment, the decoding module 210 may be omitted or bypassed, and the extension interface logic 220 may receive an extension instruction or a signal to control operation of the processor core extension 120 directly from the processor core 110 through the interface 115A. In addition, the extension interface logic 220 receives execution results and one or more output extension interface signals 225B from the extension logic 230, and provides the received execution results and/or a notification regarding the status of the execution of the extension instruction at the extension logic 230 to the execute stage of the processor core 110 through the interface 115B.

The extension interface signals 225 enable the extension logic 230 and the processor core 110 to operate together even with underdetermined number of execution cycles in the extension logic 230. The extension interface signals 225 may be used to indicate a status of the execution of the extension instruction. For example, the extension interface signals 225 include input signals, including signals provided by the instruction, signals provided by other components of the processor core 110, and signals provided from the periphery of the processor core 110. For example, input extension interface signals 225A include InstName_start, which is enabled on the first cycle of the extension instruction, where InstName is determined by the name of the extension instruction. Additional input extension interface signals may include InstName_end, which indicates the last cycle of the extension instruction; and InstName_stall, which indicates that the pipeline is stalled, and therefore the extension instruction should stall. The extension interface signals 225 also include output signals that provide a result back to the processor core 110, set extension flags, or provide base flags back to the processor core 110. For example, output extension interface signals 225B include InstName_res, which is present in the interface when the extension is to write back a result to indicate the availability of an extension ALU result; and InstName_ready, which indicates that a self-timed extension instruction is ready to provide its result in the current processor clock cycle. Preferably, each of InstName_start, InstName_end, InstName_stall, and InstName_ready signals can be implemented in 1 bit, and InstName_res signal can be implemented with 32 bit or 64 bit.

Such a feature is beneficial because the user-defined extension instruction may have a computation time that is variable, and may be dependent on data values or conditions external to the processor core 110 or the extension logic 230. By using the handshake protocol, the processor core extension 120 executing the self-timed user-defined extension instruction informs the processor core 110 when the instruction is ready to provide a result. For example, as previously discussed, when a self-timed extension instruction is being executed, the extension logic 230 provides an output called InstName_ready to the extension interface logic 220 through the extension interface signal 225B. In response, the extension interface logic 220 provides a notification to the processor core 110 that the extension result is ready through the interface 115B. In one embodiment, the InstName_ready signal is asserted in the same cycle as InstName_start, if the instruction is able to complete in one cycle, or it may be delayed by an arbitrary number of cycles according to the design of the extension logic 230.

The extension register 240 is a repository for storing data for performing extension instructions. The extension register 240 may be used to store any information for executing extension instructions. The extension register 240 may also be used to store operation results or status of the operations.

Beneficially, the handshake protocol employed by self-timed extension instruction allows the extension logic 230 to be designed and implemented independently from the pipeline. Because the extension interface logic 220 can inform the processor core 110 when the instruction is ready to provide a result, the processor core 110 does not need a priori knowledge of how many processor clock cycles that the instruction will take to complete. This, in turn, allows the processor core 110 and the extension logic 230 to be designed and placed and routed independently.

Figure 3:
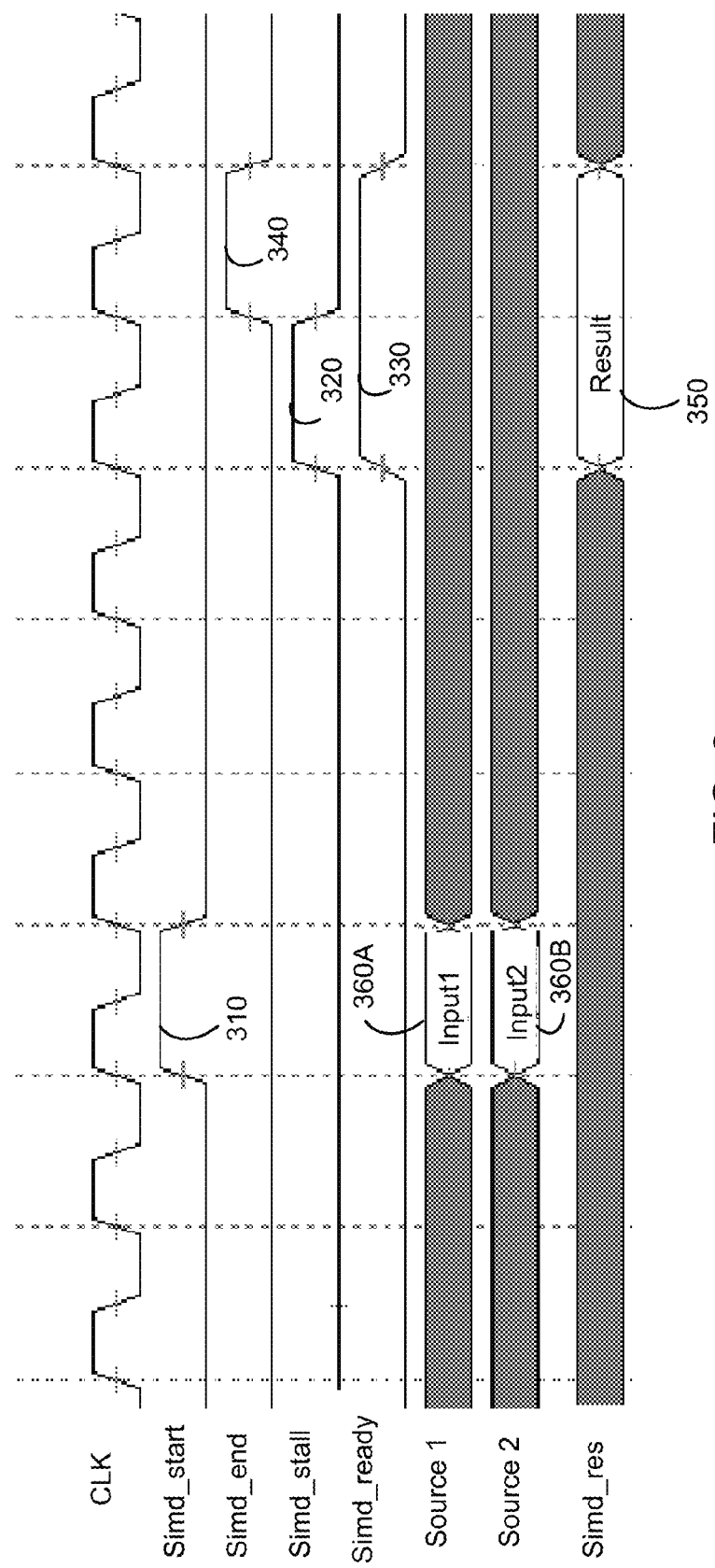
FIG. 3 is an example timing diagram of the processor core extension executing an autonomous blocking extension instruction, according to one embodiment.

FIG. 3 is an example timing diagram of the processor core extension 120 executing an autonomous (i.e., self-timed) blocking extension instruction, according to one embodiment. The timing diagram includes waveforms for a processor clock CLK, start signal simd_start, end signal simd_end, stall signal simd_stall, ready signal simd_ready, source operand source 1, source operand source 2, and response signal simd_res.

In one approach, the processor core extension 120 receives an extension instruction through the interface 115A from the execute stage of the processor pipeline. After decoding the extension instruction using the decoding module 210, the extension interface logic 220 provides simd_start signal 310 to the extension logic 230 through the extension interface signal 225A. The extension logic may provide the decoded extension instruction and source operands source 1 360A and source 2 360B to the extension logic 230 through the extension interface signal 225A. If a self-timed extension instruction is killed by the processor core 110, the extension interface logic 220 continues to track the extension instruction until it receives simd_ready signal 330 from the extension logic 230. After executing the extension instruction, the extension logic 230 provides simd_ready signal 330 to the extension interface logic 220 to indicate results of the extension instruction is ready through the extension interface signal 225B. In addition, the extension logic 230 provides simd_res signal 350 with execution results of the extension instruction to the extension interface logic 220 through the extension interface signal 225B. The extension interface logic 220 may provide a notification to the processor core 110 that the execution results of the extension instruction are ready through the interface 115B. In one aspect, the execution results 350 or information for executing an extension instruction may be stored in the extension register 240.

In this example, the simd_stall signal 320 may be asserted when the simd_ready signal 330 is asserted. Stalls may be caused by an earlier, independent instruction that is in a later pipeline stage of the processor core 110. In one aspect, the decoding module 210 receives a signal or an instruction from the processor core 110 to stall the execution of the extension instruction through the interface 115A, and the decoding module 210 provides operands 215 or decoded signals to the extension interface logic 220. In another aspect, the extension interface logic 220 receives the command or a signal from the processor core 110 directly to stall the extension instruction, and the extension interface logic 220 provides simd_stall signal 320 to the extension logic 230 through the extension interface signal 225A. The extension logic 230 may retain the simd_ready signal 330 and all result fields (data and flags) unchanged, because the processor core 110 may be unable to respond to the simd_ready signal when the pipeline is stalled.

Self-timed extension instruction terminates whenever the simd_end signal 340 is generated. Preferably, the processor core 110 provides a signal (or a command) to terminate the self-timed instruction after receiving the notification that the extension results are ready. In this example, after simd_stall signal 320 is asserted, the processor core 110 may provide a command to terminate the extension instruction. In one aspect, the decoding module 210 receives a signal or an instruction from the processor core 110 to terminate the execution of the extension instruction through the interface 115A, and the decoding module 210 provides operands 215 or decoded signals to the extension interface logic 220. In another aspect, the extension interface logic 220 receives the command or a signal from the processor core 110 directly to terminate the extension instruction, the extension interface logic 220 provides simd_end signal 340 to the extension logic 230 through the extension interface signal 225A. Responsive to receiving simd_end signal 340, the extension interface logic 220 provides the execution results 350 of the extension instruction to the execute stage of the pipeline in the processor core 110 through the interface 115B. In one aspect, the extension interface logic 220 provides the execution results 350 from the extension logic 230 to the processor core 110. In another aspect, the extension interface logic 220 retrieves execution results 350 from the extension registers 240, and provides the retrieved extension results 350 to the processor core 110. After receiving the execution results 350, the processor core 110 may proceed to the commit stage. In addition, the processor core extension 120 terminates execution of the extension instruction.

Method of Configuring the Processor Core Extension

Figure 4:
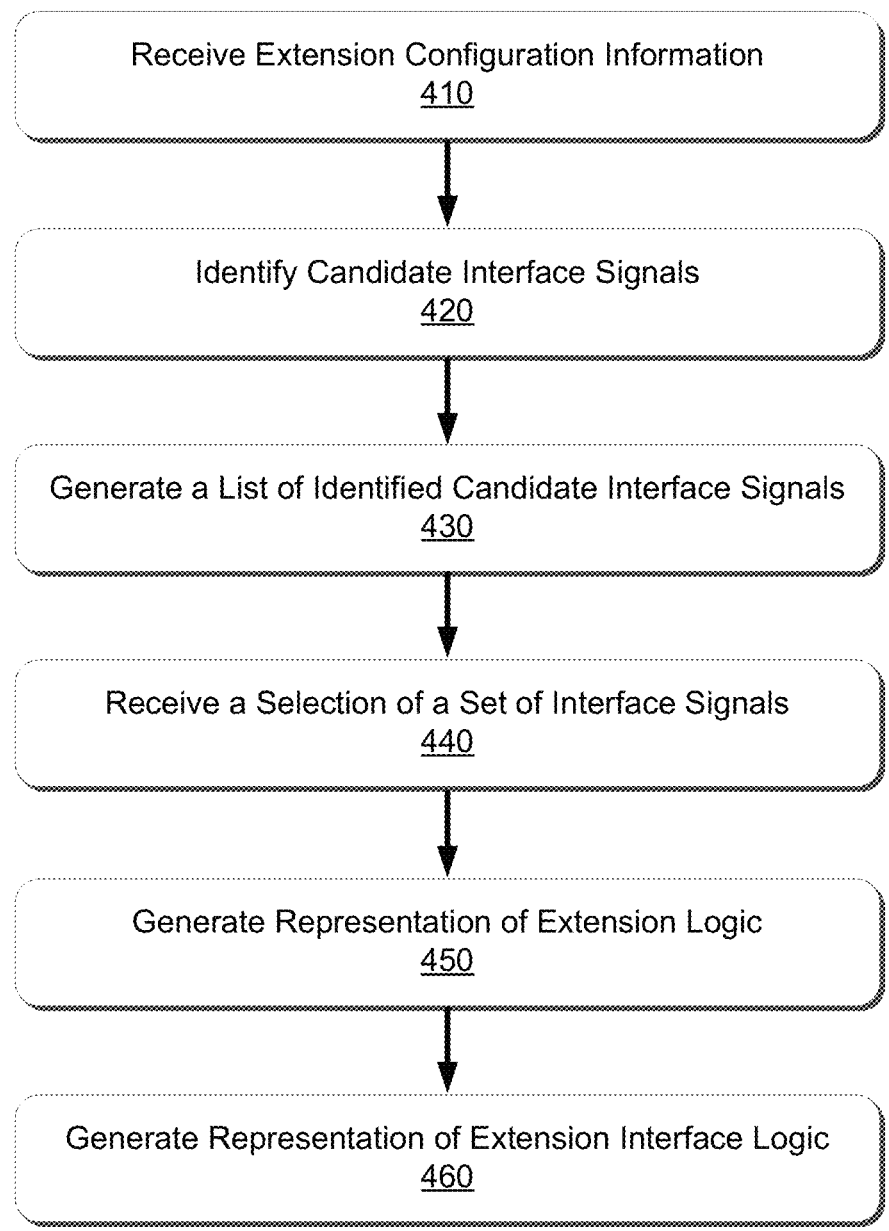
FIG. 4 is a flow diagram of a method of configuring the processor core extension, according to one embodiment.
Figure 5:
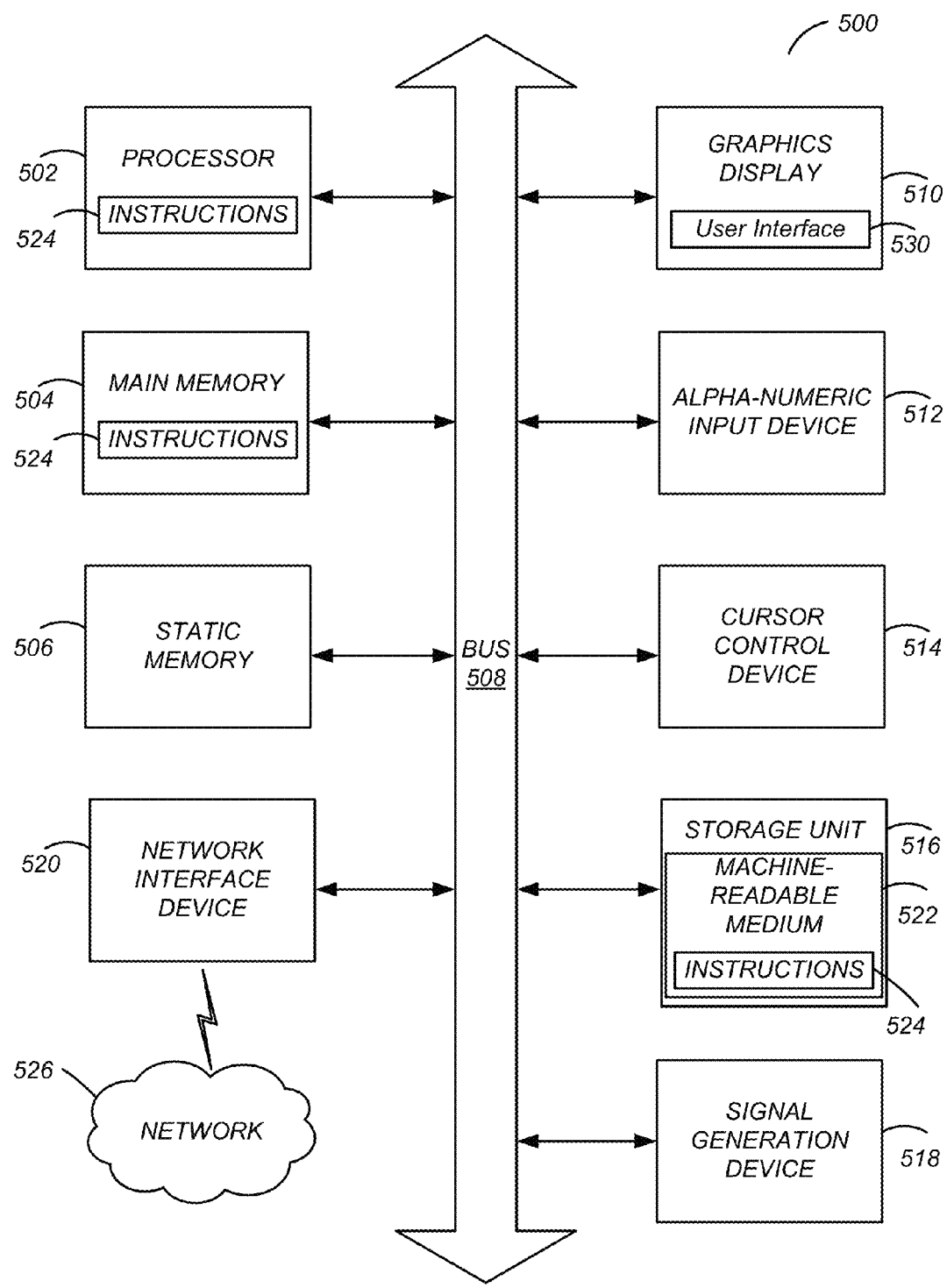
FIG. 5 illustrates one embodiment of components of an example machine able to read instructions or representations from a machine-readable medium and execute them in a processor (or controller).

FIG. 4 is a flow diagram of a method of configuring a processor core extension 120, according to one embodiment. A user may customize the processor core 110 by using a computer system equipped with a user interface and its own processor, as shown in FIG. 5. Using the user interface, the computer system may receive inputs from a user and configure the processor core 110 or the processor core extension 120 to add one or more user-defined extension instructions. The processor core extension 120 may be configured at design time or reconfigured in accordance with user-defined extension instructions during runtime (i.e., when the processor core 110 is executing another instruction) to support new instructions or other functionality as previously described.

In one approach, the computer system receives 410 extension configuration information defining the processor core extension 120 to execute a user-defined extension instruction. The computer system may receive configuration information using the user interface. The user-defined extension instruction may be an autonomous instruction (i.e., self-timed instruction). In one aspect, the extension configuration information describes an autonomous extension instruction and information about at least one of registers and condition codes of the processor core extension 120. For example, the extension configuration information may include, the number of extension core registers, the core register addresses, the ALU mnemonic. In addition, the extension configuration information may further include instruction format, specification of the operation of the instructions, the types of operands, memory address space, and interrupt and exception handling.

In addition, the computer system identifies 420 candidate interface signals for communicating via an extension interface between a processor core 110 and extension logic 230 in the processor core extension 120. In one aspect, the processor core extension 120 processes the autonomous instruction according to the extension configuration information. Preferably, the identified candidate interface signals include a ready status signal to indicate that the extension logic 230 is ready to provide a result of the autonomous instruction to the processor core 110. In addition, the identified candidate interface signals may further include, but not limited to, a start signal, an end signal, a stall signal and a response signal.

In one approach, the system generates 430, for display on the user interface, a list of identified candidate interface signals. The system may generate, for display, information about one or more of the identified candidate interface signals. The user may select desired signals from the list of identified signals. The system receives 440 a selection of a set of interface signals from the list of identified candidate interface signals. Preferably, the selection of the set of interface signals includes the ready status signal and one or more additional interface signals.

In one approach, responsive to receiving the selection of the set of interface signals, the computer system generates 450 a representation of the extension logic 230 to process the autonomous instruction according to the configuration information, and generates 460 a representation of the extension interface logic 220 to process the selected set of interface signals. The representations of the extension logic 230 and the extension interface logic 220 can be stored as an IP level design in a library, and the stored design may be loaded for a future use or modification.

Furthermore, the computer system may implement or configure a processor 100 or a processor core extension 120 in a hardware unit that can execute the autonomous instruction using the representations of the extension interface logic 220 and the extension logic 230. In one implementation, the computer system may include microarchitecture that specifies the way extension logic 230 and the extension interface logic 220 are implemented. For example, the microarchitecture configuration options selections include options for instantiating an electronic representation of the processor core 110 and/or processor core extension 120 in a circuit design, build options, reset options, and user-defined extension instructions configured to execute instructions as specified by the instruction set architecture.

Other embodiments can perform the steps of FIG. 4 in different orders. Moreover, other embodiments can include and/or an additional step than the one described here. For example, generating a list of identified candidate interface signals and receiving a selection of the set of interface signals may be omitted or performed automatically without a user selection. For another example, generating extension logic and extension interface logic may be performed together or in a different order.

Computing Machine Architecture

Turning now to FIG. 5, it is a block diagram illustrating components of an example machine able to read instructions from a machine-readable medium and execute them in a processor 502 (or controller). Specifically, FIG. 5 shows a diagrammatic representation of a machine in the example form of a computer system 500 within which instructions 524 (e.g., software or program code) for storing electronic representation of the disclosed processor 100 or a processor core extension 120 as described with respect to FIGS. 1-4 in a computer readable medium 522 (storage). The electronic representation may be employed in electronic design automation (EDA) software in the process of design of integrated circuits and systems. In addition, the computer system 500 may include code or instructions operable to configure a configurable processor 100 or a processor core extension 120 as disclosed herein. The machine may operate as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, or any machine capable of executing instructions 524 (sequential or otherwise) that specify actions to be taken by that machine. Further, while only a single machine is illustrated, the term "machine" shall also be taken to include any collection of machines that individually or jointly execute instructions 524 to perform any one or more of the methodologies discussed herein.

The example computer system 500 includes a processor 502 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 504, and a static memory 506, which are configured to communicate with each other via a bus 508. The processing components are the processor 502 and memory 504. These components can be configured to operate the engines or modules with the instructions that correspond with the functionality of the respective engines or modules. The computer system 500 may further include graphics display unit 510 (e.g., a plasma display panel (PDP), a liquid crystal display (LCD), a projector, or a cathode ray tube (CRT)). The computer system 500 may provide, for display to a user, a user interface 530 on the display unit 510. A user may configure a configurable processor 100 or a processor core extension 120 using the user interface 530. The computer system 500 may also include alphanumeric input device 512 (e.g., a keyboard), a cursor control device 514 (e.g., a mouse, a trackball, a joystick, a motion sensor, or other pointing instrument), a storage unit 516, a signal generation device 518 (e.g., a speaker), and a network interface device 520, which also are configured to communicate via the bus 508.

The storage unit 516 includes a machine-readable medium 522 on which is stored instructions 524 (e.g., software or program code) embodying any one or more of the methodologies or functions described herein. The instructions 524 (e.g., software or program code) may also reside, completely or at least partially, within the main memory 504 or within the processor 502 (e.g., within a processor's cache memory) during execution thereof by the computer system 500, the main memory 504 and the processor 502 also constituting machine-readable media. The instructions 524 (e.g., software) may be transmitted or received over a network 526 via the network interface device 520.

While machine-readable medium 522 is shown in an example embodiment to be a single medium, the term "machine-readable medium" should be taken to include a single medium or multiple media (e.g., a centralized or distributed database, or associated caches and servers) able to store instructions (e.g., instructions 524). The term "machine-readable medium" shall also be taken to include any medium that is capable of storing instructions (e.g., instructions 524) for execution by the machine and that cause the machine to perform any one or more of the methodologies disclosed herein. The term "machine-readable medium" includes, but not be limited to, data repositories in the form of solid-state memories, optical media, and magnetic media.

In one implementation, the computer readable medium 522 stores representations of the disclosed processor 100. The representations of the disclosed processor 100 may be employed in electronic design automation (EDA) software in the process of design of integrated circuits and systems. For example, machine-readable medium 522 may include electronic (or digital) representations of the processor 100 or a portion of the processor 100 (e.g., processor core 110 or processor core extension 120) in circuit description language, such as register transfer language (RTL) or hardware description language (HDL). The processor 100 or the portion of the processor 100 may be represented as a placed and routed design or design layout format (e.g., graphic data system II or GDS II).

In one implementation, the computer readable medium 522 stores code or an instruction 524 for configuring a configurable processor 100. The code or instruction 524 may be operable to select whether to configure a configurable processor 100 or a processor core extension 120 to incorporate the disclosed code extension instructions based on one or more selections received by the computer system 500. As such, a non-transitory computer readable medium 522 may include code or instruction 524 that when executed by a processor 502 of the computer system 500 implements a development tool to configure the configurable processor 100 or the processor core extension 120 to incorporate the disclosed extension instructions.

Additional Considerations

The disclosed embodiments cover processor configuration options for instructions included in an extensible instruction set architecture. Like other processor configuration options, the selection to include the disclosed extension instructions may be made during the configuration of a processor 100. The processor 100 may be a specialized processor in that it is customizable to include memories, caches, arithmetic components, and extensions. For example, the processor 100 may be programmed to operate as a reduced instruction set computing (RISC) processor, digital signal processor (DSP), graphics processor unit (GPU), applications processor (e.g., a mobile application processor), video processor, or a central processing unit (CPU) to access memory, and exchange commands with other computing devices.

The foregoing description of the embodiments has been presented for the purpose of illustration; it is not intended to be exhaustive or to limit the embodiments to the precise forms disclosed. Persons skilled in the relevant art can appreciate that many modifications and variations are possible in light of the above disclosure.

Finally, the language used in the specification has been principally selected for readability and instructional purposes, and it may not have been selected to delineate or circumscribe the inventive subject matter. It is therefore intended that the scope of the disclosed embodiments be limited not by this detailed description, but rather by any claims that issue on an application based hereon. Accordingly, the disclosure of the embodiments is intended to be illustrative, but not limiting in scope, as set forth in the following claims.

The invention claimed is:

1. A method for configuring a processor core extension for executing an autonomous instruction, the method comprising:
   receiving, using a user interface, extension configuration information defining the processor core extension, the extension configuration information describing an autonomous extension instruction and information about at least one of registers and condition codes of the processor core extension;
   identifying candidate interface signals for communicating via an extension interface between a processor core and extension logic in the processor core extension that processes the autonomous instruction in accordance with the extension configuration information, the identified candidate interface signals including a ready status signal indicating that the extension logic is ready to provide a result of the autonomous instruction to the processor core;
   generating, for display on the user interface, a list of the identified candidate interface signals and information about one or more of the identified candidate interface signals;
   receiving a selection of a set of interface signals to be processed by the extension interface from the list of the identified candidate interface signals, the set of interface signals including the ready status signal and one or more additional interface signals;
   generating a digital representation of the extension logic to process the autonomous instruction according to the extension configuration information; and
   generating a digital representation of extension interface logic to process the selected set of interface signals.

2. A method for configuring a processor core extension for executing an autonomous instruction, the method comprising:
   identifying candidate extension interface signals representing signals selectable for communication via an extension interface between a processor core and extension logic in the processor core extension that processes at least the autonomous instruction at the extension logic in accordance with extension configuration information defining the processor core extension, the identified candidate extension interface signals including a ready status signal indicating that the extension logic is ready to provide a result of the autonomous instruction to the processor core;
   generating a digital representation of the extension logic to process the autonomous instruction; and
   generating a digital representation of extension interface logic to process a set of interface signals including the ready status signal selected from the identified candidate extension interface signals, the set of interface signals including the ready status signal.

3. The method of claim 2, further comprising receiving, using a user interface, the extension configuration information.

4. The method of claim 2, wherein the extension configuration information describes the autonomous instruction that is processed by the extension logic and information about at least one of registers and condition codes of the processor core extension.

5. The method of claim 2, further comprising:
   generating, for display on a user interface, a list of the identified candidate extension interface signals; and
   receiving a selection of the set of interface signals from the list of the identified candidate extension interface signals including the ready status signal and one or more additional interface signals to be communicated via the extension interface.

6. The method of claim 2, wherein the set of interface signals includes a start signal indicating a first execution cycle of the autonomous instruction.

7. The method of claim 2, wherein the set of interface signals includes an end signal indicating a last execution cycle of the autonomous instruction.

8. The method of claim 2, wherein the set of interface signals includes a stall signal to prevent or delay an execution of another instruction at the extension logic.

9. The method of claim 2, wherein the processor core extension is configured when the processor core executes another instruction.

10. A non-transitory computer readable medium configured to store program code for configuring a processor core extension that executes an autonomous instruction, the program code comprising instructions that when executed by a processor cause the processor to:
    identify candidate extension interface signals representing signals selectable for communication via an extension interface between a processor core and extension logic in the processor core extension that processes at least the autonomous instruction at the extension logic in accordance with extension configuration information defining the processor core extension, the identified candidate extension interface signals including a ready status signal indicating that the extension logic is ready to provide a result of the autonomous instruction to the processor core;
    generate a digital representation of the extension logic to process the autonomous instruction; and
    generate a digital representation of extension interface logic to process a set of interface signals including the ready status signal selected from the identified candidate extension interface signals, the set of interface signals including the ready status signal.

11. The non-transitory computer readable medium of claim 10, wherein the instructions executed by the processor further cause the processor to:

receive, using a user interface, the extension configuration information.

12. The non-transitory computer readable medium of claim 10, wherein the extension configuration information describes the autonomous instruction that is processed by the extension logic and information about at least one of registers and condition codes of the processor core extension.

13. The non-transitory computer readable medium of claim 10, wherein the instructions executed by the processor further cause the processor to:
   generate, for display on a user interface, a list of the identified candidate extension interface signals; and
   receive a selection of the set of interface signals from the list of the identified candidate extension interface signals including the ready status signal and one or more additional interface signals to be communicated via the extension interface.

14. The non-transitory computer readable medium of claim 10, wherein the set of interface signals includes a start signal indicating a first execution cycle of the autonomous instruction.

15. The non-transitory computer readable medium of claim 10, wherein the set of interface signals includes an end signal indicating a last execution cycle of the autonomous instruction.

16. The non-transitory computer readable medium of claim 10, wherein the set of interface signals includes a stall signal to prevent or delay an execution of another instruction at the extension logic.

17. The non-transitory computer readable medium of claim 10, wherein the processor core extension is configured when the processor core executes another instruction.

18. A non-transitory computer readable medium storing a representation of a processor core extension for executing an autonomous instruction, the processor core extension comprising:
   extension logic to execute the autonomous instruction and indicate a result of the autonomous instruction is ready using a ready status signal, the ready status signal selected from candidate extension interface signals for communication via an extension interface between a processor core and the extension logic in the processor core extension that processes at least the autonomous instruction at the extension logic in accordance with extension configuration information defining the processor core extension, and
   extension interface logic coupled to the processor core and the extension logic, the extension interface logic to coordinate operation of the processor core and the extension logic using one or more of the candidate extension interface signals including the ready status signal.

19. The non-transitory computer readable medium of claim 18, wherein responsive to receiving the autonomous instruction from an execute stage of the processor core coupled to the processor core extension, the extension interface logic provides a start signal and the autonomous instruction to the extension logic for executing the autonomous instruction, the start signal indicating a first execution cycle of the autonomous instruction.

20. The non-transitory computer readable medium of claim 19, wherein the extension logic provides the ready status signal and execution results to the extension interface logic, and the extension interface logic provides a notification corresponding to the ready status signal and the execution results to the execute stage of the processor core.

21. The non-transitory computer readable medium of claim 18, wherein responsive to receiving, from the processor core coupled to the processor core extension, a signal for terminating execution of the autonomous instruction, the extension interface logic provides an end signal to the extension logic for terminating the execution of the autonomous instruction, the end signal indicating a last execution cycle of the autonomous instruction.

* * * * *